(12) United States Patent
Ikeshima

(10) Patent No.: US 7,465,486 B2
(45) Date of Patent: Dec. 16, 2008

(54) CERAMIC HONEYCOMB STRUCTURE

(75) Inventor: Koichi Ikeshima, Okazaki (JP)

(73) Assignee: NGK Insulators, Ltd., Nagoya (JP)

( * ) Notice: Subject to any disclaimer, the term of this patent is extended or adjusted under 35 U.S.C. 154(b) by 403 days.

(21) Appl. No.: 10/983,580

(22) Filed: Nov. 9, 2004

(65) Prior Publication Data

US 2005/0106356 A1    May 19, 2005

(30) Foreign Application Priority Data

Nov. 13, 2003    (JP)  ............................. 2003-383352

(51) Int. Cl.
 *B32B 3/12* (2006.01)
(52) U.S. Cl. .................................... 428/116
(58) Field of Classification Search .................. 422/180, 422/122, 177; 428/116, 43.4, 188, 192, 73, 428/319.9, 307
See application file for complete search history.

(56) References Cited

U.S. PATENT DOCUMENTS

| | | | | |
|---|---|---|---|---|
| 4,489,774 | A * | 12/1984 | Ogawa et al. | .................. 165/10 |
| 4,956,329 | A * | 9/1990 | Chao et al. | .................. 502/251 |
| 5,514,446 | A | 5/1996 | Machida et al. | |
| 6,709,704 | B2 * | 3/2004 | Yamaguchi et al. | .......... 427/259 |
| 7,022,376 | B2 * | 4/2006 | Ichikawa et al. | ............. 427/230 |
| 2003/0032545 | A1 * | 2/2003 | DiChiara, Jr. | ................. 501/87 |
| 2005/0106356 | A1 * | 5/2005 | Ikeshima | .................... 428/116 |

FOREIGN PATENT DOCUMENTS

| | | |
|---|---|---|
| EP | 0 452 125 A | 10/1991 |
| EP | 0 554 104 A2 | 8/1993 |
| EP | 0 554 104 A3 | 8/1993 |
| EP | 0 789 042 A | 10/1997 |
| EP | 1 419 816 A | 5/2004 |
| EP | 1 473 445 A | 11/2004 |
| EP | 1 484 100 A | 12/2004 |
| JP | 53-133860 | 3/1952 |
| JP | 51-44713 | 11/1976 |
| JP | 53-34373 | 8/1978 |
| JP | 56-129042 | 10/1981 |
| JP | 56-129043 | 10/1981 |
| JP | 07-000183 | 1/1995 |
| JP | 07-246341 | 9/1995 |
| WO | WO 03/009938 A | 2/2003 |
| WO | WO 03/067043 A | 8/2003 |
| WO | WO 03/076047 A | 9/2003 |

\* cited by examiner

*Primary Examiner*—Timothy M. Speer
*Assistant Examiner*—Gordon R Baldwin
(74) *Attorney, Agent, or Firm*—Oliff & Berridge, PLC

(57) ABSTRACT

The present invention provides a ceramic honeycomb structure, capable of certainly repairing the defect parts formed in the outer walls without lowering the mechanical strength or the thermal shock resistance and solving the liquid leakage trouble to the outer walls in the catalyst coating process. The ceramic honeycomb structure comprises a number of passages divided by a number of partition walls, and an outer wall dividing the passages from an outside of the honeycomb structure. A ceramic material is filled into at least one defective area on a surface of the outer wall, which has a hole of at least 0.1 mm in width communicating with the passage and the outside.

8 Claims, 1 Drawing Sheet

CERAMIC HONEYCOMB STRUCTURE

TECHNICAL FIELD

The present invention relates to a ceramic honeycomb structure in which an open defect including a fissure and a crack extending through an outer wall formed in a production process is repaired.

BACKGROUND ART

Recently, in regard to prevention of the atmospheric pollution, tightening of the automotive exhaust gas regulation has been discussed.

At present, a catalytic converter having a ceramic honeycomb structure as a carrier, which is monolithically formed by extrusion, and has a number of passages (cells) each surrounded by partition walls, is used for purification of automotive exhaust gas. In order to improve purification efficiency of the honeycomb structure, a study is in progress on improvement of so called warm up characteristic, that is improvement of catalytic activity at an initial driving stage by reducing a heat capacity of the honeycomb structure, consequently by making warm up faster.

It is required to reduce weight without changing geometrical surface area of a honeycomb structure (that is to reduce bulk density of a honeycomb structure) for reducing heat capacity of a honeycomb structure. Thus, actions such as reducing a thickness of partition walls, increasing porosity, or the like are taken to meet the requirement. For example, reduction of the honeycomb partition walls thickness is extremely difficult in the production technology, because in general it accompanies a decline of the mechanical strength of the honeycomb structure. Since the amount of the kneaded clay in the outer wall part of the honeycomb structure (honeycomb formed body) to be obtained at the time of extrusion forming differs from that of the partition walls, the outer wall and the partition walls are inevitably unbalanced. If the outer wall is made thicker, the cell deformation defect occurs, and if it is made thinner, fissure (crack) of the outer wall occurs. Therefore forming of the outer wall part of the ceramic honeycomb structure is the key point of the production technology.

Therefore, in the case of such a honeycomb structure, the open defects including a fissure and a crack extending through the outer wall, for example, various defects extending through the outer wall as shown in FIG. 1 (open tears 1, lateral fissure 2, vertical fissure 3) occur inevitably in a certain ratio in drying or firing steps.

Such an open defect including a fissure and a crack extending through an outer wall occurred in a production process may cause a problem in a catalyst coating process. In the catalyst coating process, an aqueous slurry including a mixture of γ-alumina for increasing the specific surface area, ceria as an oxygen absorbing material, zirconia for improving the heat resistance, or the like, is supplied to the honeycomb passage with a pressure applied by sealing the outer circumferential part of the ceramic honeycomb structure. At the time, if there is a hole extending through the outer wall, when a positive pressure is applied to the aqueous solution, a part of the aqueous slurry leaks to the honeycomb outer circumferential part, thereby the leaked portion of the slurry is wasted and a sealing trouble would occur at the time of the next process. On the other hand, in the case the honeycomb structure end face is kept at a negative pressure, such a trouble that the slurry is not coated at least partially on the surfaces of the honeycomb passages would occur.

Moreover, the honeycomb catalyst obtained in the catalyst coating process is used in an airtight metal container. Since the thermal expansion of the metal container is larger than the thermal expansion of the honeycomb catalyst, the honeycomb catalyst is housed in the metal container via a ceramic mat having the cushion property with preloaded mechanical pressure thereon so as to avoid loosening even the metal container heated in use expands more than the honeycomb catalyst. Here, if the catalyst material locally adheres to the outer wall of the ceramic honeycomb catalyst, the mechanical pressure at that portion becomes high, and could destroy the honeycomb catalyst in some cases.

To solve the above-mentioned problems, various countermeasures are proposed, such as, a honeycomb structure covered with a thick reinforcing material at outer circumferential part (see the patent literature 1:JP-B-51-44713), a honeycomb structure with an outer wall provided on the structure without an outer wall, cut out from a formed and fired honeycomb structure (see the patent literature 2:JP-Y-53-34373), a honeycomb structure with the outer circumferential wall with a glaze applied thereto (see the patent literature 3:JP-U-53-133860), one a honeycomb structure having the passage of the outer circumferential part filled with a ceramic material (see the patent literature 4:JP-A-56-129042), a honeycomb structure with reduced porosity at the outer circumferential part including the outer (see the patent literature 5:JP-A-56-129043), a technique for obtaining a honeycomb structure having a good dimensional accuracy by adding a ceramic material to the outer circumference of the structure having a poor accuracy (see the patent literature 6:JP-U-7-183), and a honeycomb structure having incomplete cells in the outermost circumference closed selectively with a ceramic material (see the patent literature 7: JP-A-7-246341).

However, the prior art disclosed in patent literatures 1 to 7 has the problems mentioned below. According to the patent literature 1, although the defect of the outer wall can be repaired, the thermal shock resistance is lowered because the coefficient of thermal expansion of the reinforcing material is higher than that of the cordierite honeycomb structure. Moreover, in the case the outer wall is covered with the reinforcing material, the increased heat capacity retards the temperature rise of the catalyst, and consequently the purifying performance at the time of cold start deteriorates.

The patent literature 2 is directed to the technique for applying an outer wall to a honeycomb structure without an outer wall, cut out from a formed and fired honeycomb structure, and thus it is not a technique for closing a large through hole (through hole having for example 0.1 mm or more diameter) extending through the outer wall.

According to the patent literature 3, which is directed to the technique for applying a glaze to the outer circumferential wall, a defect such as a large hole having a 0.1 mm or more diameter and a relatively deep split, or the like cannot be filled. Moreover, since the coefficient of thermal expansion of the glaze is higher than the coefficient of thermal expansion of the honeycomb structure, the thermal shock resistance deteriorates.

According to the patent literature 4, although the outer wall defect can be repaired indeed, the part with the cells in the outer circumferential part filled becomes a dead zone with respect to the exhaust gas purification as the purpose of the catalyst, because the filled part does not have the exhaust gas flow. In these days the honeycomb structure is supported only the side surface supported mechanically in consideration of using the entire volume, the part of the filled passage is totally wasted according to this technique. For example, in the case of a Φ100 mm catalyst, if a 3 mm width dead zone is provided, about 10% or more volume is wasted.

According to the patent literature 5, the pores of a honeycomb structure are filled. The pore of an ordinary ceramic honeycomb structure is mainly 50 μm or less. Therefore, this technique does not fill a defect such as a large hole having a 0.1 mm or more diameter and a relatively deep split.

The patent literature 6 is directed to the technique for obtaining a honeycomb structure having a good dimensional accuracy by covered the external circumference of the structure having a poor accuracy with a ceramic material. In some cases, there would be a part not covered with the ceramic material. Moreover, as in the case of the patent literature 1, since a 0.5 mm or more covering layer is partially present, deterioration in purification property at the cold start cannot be avoided.

The patent literature 7 is directed to the technique for selectively closing the incomplete cells in the outermost circumference with the ceramic material. Since the open defect including a fissure and a crack extending through an outer wall (see FIG. 1) is not taken into consideration at all, although the defect can be closed if the defect is at an incomplete cell part by chance, a defect at a complete cell part cannot be closed.

DISCLOSURE OF THE INVENTION

The present invention has been completed in view of the above-mentioned problems and aims at providing a ceramic honeycomb structure which can address the problem of liquid leakage at an outer wall in a catalyst coating process by repairing a defective area in the outer wall without deteriorating a mechanical strength or a thermal shock resistance of the honeycomb structures.

According to the present invention, there is provided a ceramic honeycomb structure comprising: a number of passages divided by a number of partition walls; an outer wall dividing the passages from an outside of the honeycomb structure; and a ceramic material filled into at least one defective area on a surface of the outer wall, the defective area having a hole of at least 0.1 mm in width communicating with the passage and the outside.

At this time, according to the present invention, it is preferable that the thickness of the partition walls is 0.115 mm or less. Moreover, it is preferable that the ceramic material is filled into not only the hole but also the passage communicating with the hole as a defective area.

Moreover, according to the present invention, it is preferable that the ceramic material is composed mainly of a material same as that of the ceramic honeycomb structure. Note that the word "mainly" means that any material referred to is contained in an amount capable of sharing a majority of the constitution and/or composition when the word in question is used to define the constitution and/or composition of a certain material. In the case the ceramic honeycomb structure is a formed body using water soluble binder, it is preferable that the ceramic material is composed of a raw material kneaded with oil.

In the case the ceramic honeycomb structure is a fired body, it is preferable that the ceramic material (cement material (1)) is composed mainly of cordierite particles and a colloidal silica.

Furthermore, according to the present invention, in the case the ceramic honeycomb structure is a fired body, it is preferable that the ceramic material (cement material (2)) is a catalyst slurry material composed mainly of γ-alumina.

According to the present invention, it is preferable that the honeycomb structure has the coefficient of thermal expansion of less than $3.0 \times 10^{-6}/°$ C. in a part into which the ceramic material is filled.

According to the ceramic honeycomb structure of the present invention, a defect part formed in the outer walls can be repaired surely without deteriorating the mechanical strength and/or the thermal shock resistance. Furthermore, the liquid leakage trouble to the outer walls during the catalyst coating process can be solved as well.

BEST MODE FOR CARRYING OUT THE INVENTION

A ceramic honeycomb structure of the present invention comprises a number of passages divided by a number of partition walls and an outer wall dividing the passages from an outside of the honeycomb structure, wherein a ceramic material is filled into at least one defective area on a surface of the outer wall, the defective area having a hole of at least 0.1 mm in width communicating with the passage and the outside.

Thereby, since the ceramic honeycomb structure of the present invention can repair the defect part in the outer walls such as a large hole having a 0.1 mm or more diameter and a relatively deep split, which has hardly been dealt with by the conventional technique, without deteriorating the mechanical strength or the thermal shock resistance as well as the liquid leakage trouble to the outer walls in the catalyst coating process can be solved, the yield and the performance of the ceramic honeycomb catalyst can be improved.

Figure 1:
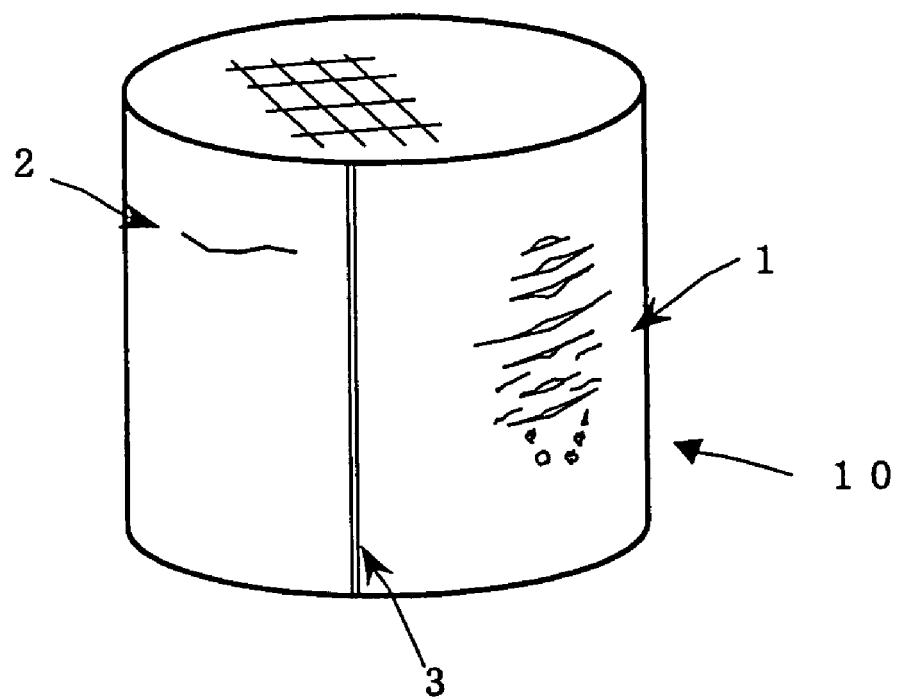
FIG. 1 is a perspective view showing schematically the examples of the defects formed in the outer walls of a ceramic honeycomb structure.

First, the outer wall defect of the ceramic honeycomb structure and the problems thereof will be explained in detail. As shown in FIG. 1, various through defects may occur in the outer walls of the ceramic honeycomb structure. The numeral 1 is referred to as the "open tears", which occur when a supply of material for forming the outer wall is short at the time of formation of the outer wall. Small open tears become holes. Depending on the state, it can be a split, and furthermore, a crack may be formed from the end. The numeral 2 is referred to as the "lateral fissure", which occurs by quick partial drying of the outer walls or drastic contraction of the outer circumferential part at the time of firing. The numeral 3 is referred to as the "vertical fissure", which becomes apparent in the drying and firing step due to insufficient pressure bonding of the material at the time of forming or it occurs by the contraction by drastic drying and firing of the outer wall part.

Since a part of the material for forming the outer walls is supplied also from a slit for forming the partition wall of the die, in the case of one having a thin partition wall, the material supply to the outer walls tends to be short. Particularly in the case of one having a 0.115 mm or less partition wall thickness, the open tears can easily be formed in the outer walls. Moreover, also in the case of the lateral fissure and the vertical fissure, in the case of one having a thin outer wall, it is influenced largely by the change of an outside state or the insufficient pressure bonding can easily be formed compared with the case of one having a thick thickness so that the external appearance defect can easily occur compared with one having a more than 0.1115 partition wall thickness. The defect occurrence ratio at the time of forming in one month period is shown in the table 1.

TABLE 1

| PARTITION WALL THICKNESS | OPEN TEARS | LATERAL FISSURE | VERTICAL FISSURE |
|---|---|---|---|
| 0.115 mm OR LESS | 1.35% | 0.48% | 1.22% |
| MORE THAN 0.115 mm | 0.02% | <0.01% | 0.01% |

In the case a honeycomb structure with such a defect present is supplied in the catalyst coating process, various troubles are generated. In the catalyst coating process, the honeycomb structure end face is soaked in the slurry by several mm so as to seal the honeycomb outer wall part so that the slurry is moved upward in the honeycomb passage by applying a negative pressure to the other end face. Then, by releasing the pressure at the time the slurry liquid level reaches at a predetermined position, the liquid level returned to the original position. Thereafter, it is taken out for blowing out the excessive slurry in the honeycomb passage.

At this time, since the pressure applied to the passage cannot be a negative pressure due to the air entrance from the hole if there is a hole in the outer walls, the slurry liquid level cannot be raised so as not to be supported. Moreover, if a positive pressure is applied to the liquid in the above-mentioned state, since the liquid level is raised in the honeycomb passage so as to be processed in the same manner. However, in the case there is a hole in the outer walls, the slurry is leaked from the hole so as to cause the slurry leakage to stain a sealing material. Therefore, the sealing performance is deteriorated or the slurry is sagged to the outer walls.

As to the precious metal to be the catalyst, there are the case of supporting additionally after supporting the slurry and the case of using a slurry material with the precious metal preloaded. In either case, a long time is required for supporting the precious metal to the slurry. In the former case, it is common to soak the entire honeycomb structure in the precious metal solution, and thus the precious metal is supported by the slurry sagged to the outer walls so as to be wasted in either case.

Moreover, as to the defect size, an ordinary ceramic honeycomb structure has pores, which have a 50 μm or less size measured by the Mercury porosimeter method in most cases. In the catalyst step, in the case a through hole of 0.1 mm or more, which is a diameter double as much as that, is present in the outer walls, a trouble is generated at the time of introducing the slurry into the passage by a negative pressure. Moreover, the through hole size at the time the slurry leakage begins from the outer walls depends largely on the slurry viscosity, and it is learned to be about 0.5 mm or more from the experience. Although leakage maybe caused in the case of about 0.3 mm through hole, it is in general extremely rare and it is of a tolerable level. The trouble has become more evident according to the thinning of the partition wall thickness to 0.115 mm or thinner so that the passage density becomes as dense as 62, 93, 140 pieces/cm$^2$ so as to lower the slurry viscosity for preventing the choking generation.

In consideration of the above-mentioned problems, the ceramic honeycomb structure of the present invention solves the liquid leakage trouble to the outer wall in the catalyst coating process even in the case of a 0.115 mm or less partition wall thickness.

At this time, in the case of a ceramic honeycomb structure having a 0.115 mm or less partition wall thickness, since the outer wall defect parts are provided by several points or less in most cases, it is preferable to fill the defect parts by applying a paste like ceramic material for repairing the outer walls.

In this case, it is preferable that the ceramic material is filled into not only the hole but also the passage communicating with the hole. If the passage is closed, although the slurry is not supported, the exhaust gas does not flow either. Even in the case the passage is closed at several points for repair, the purifying performance and the pressure loss are not influenced thereby. Moreover, in the case of a large size defect, the peeling of the repaired portion can be prevented by closing the passage rather than bonding the repair material only to the outer walls.

According to the present invention, it is preferable that the coefficient of thermal expansion of the honeycomb structure in the part with the ceramic material filled into is less than $3.0 \times 10^{-6}/°$ C. for preventing deterioration in the mechanical strength or thermal shock resistance at the time of practical use of the honeycomb structure.

In the case repair is executed before firing of the ceramic honeycomb structure of the present invention, it is preferable that the same ceramic material (repair material) as the honeycomb structure material is used in a paste like form. Here, the same material as the honeycomb structure refers to the ceramic material excluding the liquid and the binder for forming. Although the honeycomb structure material before firing used at this time is not particularly limited, in the case a cordierite raw material to be cordierite by firing the honeycomb structure is used, the same cordierite raw material can be used preferably for the repair material.

Moreover, in the case water and water soluble binder are used at the time of forming the honeycomb structure, it is preferable to knead like a paste with nonaqueous oil, or the like so as not to alter the honeycomb structure formed body by the repair material. As to the oil used in this process, there is no particular restriction and, for example, kerosene can be suitably used. In the case the liquid and the binder are not water or a water soluble material, it is not limited to oil, and in the case water insoluble liquid and binder are used, water can be used for the repair material.

Moreover, according to the ceramic honeycomb structure of the present invention, in the case repair is executed after firing the honeycomb structure, it is preferable that the outer wall defect part is repaired with a cement material (cement material (1) or cement material (2)) as the ceramic material (repair material). The cement material may have the porosity and water absorbing ratio same as or less than those of the honeycomb structure main body, and it may have the water repellent property. Moreover, it is desired that the cement material has a small contraction by drying so as to prevent the through crack formation caused by drying.

It is preferable that the cement material (1) has about the same coefficient of thermal expansion as that of the honeycomb structure, and it is more preferable to use the honeycomb structure main body material particles for the aggregate so as to have the coefficient of thermal expansion closer.

Here, the honeycomb structure main body material particles in general refers to cordierite particles. By using colloidal oxide to the cordierite particles as inorganic binder, the cement material (1) can be obtained. Moreover, it is preferable that the cement material (1) has the weight ratio of the cordierite particles and colloidal oxide (based on the solid component) of 100:2 to 100:50 for preferably maintaining the adhesion property of the repaired portion to the honeycomb structure main body and the heat characteristics of the honeycomb structure after the repair. It is preferable that the cordierite particles are fired particles having in general a 50 μm or less average particle size. One having a two stage particle distribution, produced by blending those having a fine average particle size and those having a relatively coarse average particle size, such as a mixture of those having a 15

μm or less average particle size and those having a 30 μm or more average particle size, or the like can be used optionally. As to the colloidal oxide, there is no particular restriction and, for example, colloidal silica can be suitably used.

The cement material (2) is a catalyst slurry material composed mainly of γ-alumina to be used in the catalyst coating process. The slurry viscosity may be adjusted in the catalyst coating process so as to be used as the repair material.

EXAMPLE

The present invention will be described hereinafter in more detail based on examples. However, the present invention is not limited to these examples.

Examples 1 to 3, Comparative Examples 1 and 2

For the selection of the repair material, the following evaluation was executed. A formed body and a fired body of a honeycomb structure to become cordierite by firing, having a 0.09 mm rib thickness, 62 passages/cm$^2$, diameter Φ106 mm×height 114 mm, and $0.5 \times 10^{-6}$/° C. coefficient of thermal expansion were prepared. Among the formed bodies, those having defects of open tears or a vertical fissure were selected so as to be repaired with the ceramic material (repair material) "before firing" shown in the table 2 for the observation of the repaired portion after firing (example 1, comparative example 1). Moreover, out of the formed bodies, those having defects of open tears or a vertical fissure were selected and fired so as to be repaired with the ceramic material (repair material) "after firing" shown in the table 2 for the observation of the repaired portion after a heat process (examples 2 to 3, comparative example 2). The coefficient of thermal expansion was measured by the specimen cut out by 3.5×3.5×50 Lmm including the part with the vertical fissure part repaired. Moreover, the heat process was executed at 900° C., which can be used in an automobile, for 10 hours in an electric furnace.

so that the repair work can be executed preferably without abnormality. In contrast, according to the comparative examples 1, 2, since the coefficient of thermal expansion of the ceramic material (repair material) of the alumina (comparative example 1) and the zirconia silicate (comparative example 2) is larger than the coefficient of thermal expansion of the honeycomb structure, abnormality was generated in the repaired portion.

Examples 4 and 5, Comparative Examples 3 to 5

40 pieces of ceramic honeycomb structures having an open tears 1 (see FIG. 1) before firing were prepared. The open tears were in a split state like a lip having a 0.3 mm to 4 mm maximum opening width, a 4 to 10 mm length and a maximum 5 mm crack on the end and extending in the direction perpendicular to the passage, and 5 pieces to 21 pieces form a row at a length portion of 30 mm in the entire length direction. As the honeycomb structure material, a raw material to become cordierite by firing was used. 10 pieces out of them were repaired by coating paste prepared by kneading the same material with oil onto the defective portions so as to make the coated surface thereon at the same plane as the outer walls. Thereafter, they were fired with 30 pieces having the open tears without repair and 10 pieces without the external appearance defect such as the open tears so as to obtain the cordierite honeycomb structures having a 0.065 mm rib thickness, 140 passages/cm$^2$, and Φ106 mm diameter×114 mm height size. Those repaired were referred to as the example 4, those without the repair were referred to as the comparative example 3, and those without the defect were referred to as the comparative example 4.

Moreover, 10 pieces having the open tears, fired without repair were repaired by coating a repair material produced by mixing 20% of a colloidal silica and 80% of cordierite fine particles by the weight ratio and kneading like a paste into the open tears part so as to make the coated surface thereon at the same plane as the outer walls and drying so as to obtain the example 5. Moreover, by coating a slurry obtained by mixing

TABLE 2

| | Timing of repairing | Ceramic material | Composition | Coefficient of Thermal expansion ×10$^{-6}$/° C. | State of repaired portion (before firing to after firing, after firing to after heat process) | |
|---|---|---|---|---|---|---|
| | | | | | Open tear part | Vertical fissure part |
| Example 1 | Before firing | Cordierite | Raw material + kneading with oil | 0.74 | No abnormality | No abnormality |
| Comparative Example 1 | Before firing | Alumina | Raw material + kneading with oil | 3.19 | Crack at split end part was extended. | Vertical fissure into only outer wall was found, and extended inwardly up to one rib into the side wall therefrom. Partial gap formation was observed between the repaired portion and the body of structure. |
| Example 2 | After firing | Cement A | 20% of colloidal silica + 80% of cordierite particles | 0.62 | No abnormality | No abnormality |
| Example 3 | After firing | Cement B | γ-Alumina | 1.57 | No abnormality | No abnormality |
| Comparative Example 2 | After firing | Cement C | 20% of colloidal silica + 80% of zirconia silicate particles | 4.38 | Crack at split end part was extended. | Vertical fissure into only outer wall was found, and extended inwardly up to 2 ribs into the side wall therefrom. |

From the result of the table 2, it was learned that the coefficient of thermal expansion of the ceramic material (repair material) in the examples 1 to 3 is approximate to the coefficient of thermal expansion of the honeycomb structure 20% of the same colloidal silica and 80% of zirconium silicate particles by the weight ratio to the outer circumference of the honeycomb structures evenly by about 1 mm thickness and drying so as to obtain the comparative example 5.

As to the examples 4, 5 and the comparative example 5, the passages were observed from the end faces. As a result, 10 to 12 pieces of the channels adjacent to the outer walls having the open tear part were closed by the repair material. The side surface close to the end face of these honeycomb structures was mounted with a thin cylindrical synthetic resin sheet so as to seal closely. With the air sent in by 9 m³/minute, the repaired portion was observed. The repaired portion was not fallen off. Moreover, the air leakage was examined by placing a hand close to the outer walls. There was the air leakage in the comparative example 3 without the repair. However, there was no air leakage in the examples 4, 5 and the comparative example 5 so that the effectiveness of the repair was confirmed.

Next, the various performance tests shown below were executed for the examples 4, 5 and the comparative examples 3 to 5. The results are shown in the table 3.

TABLE 3

|  | Defect shape | Pressure loss 3 m³/minute kPa | Mechanical strength test Average of 5 pieces for each kind of specimens | | |
|---|---|---|---|---|---|
|  |  |  | Load resistance 1 MPa | Destruction load MPa | Destruction portion |
| Example 4 | Open tears | 0.95 | No abnormality | 3.52 | At a position different from the defect |
| Example 5 | Open tears | 0.95 | No abnormality | 3.46 | At a position different from the defect |
| Comparative Example 3 | Open tears | 0.95 | Open tears enlargement | 2.07 | Defect portion |
| Comparative Example 4 | Open tears | 0.95 | No abnormality | 3.45 | At a position different from the defect |
| Comparative Example 5 | Open tears | 0.95 | No abnormality | 4.25 | At a position different from the defect |
| Example 6 | Vertical fissure | 0.41 | No abnormality | 2.85 | At a position different from the defect |
| Example 7 | Vertical fissure | 0.41 | No abnormality | 2.77 | At a position different from the defect |
| Comparative Example 6 | Vertical fissure | 0.41 | Outer wall at the vertical fissure portion was bent inwardly by 1 cell width | 2.81 | At a position different from the defect |
| Comparative Example 7 | Vertical fissure | 0.41 | No abnormality | 2.83 | At a position different from the defect |
| Comparative Example 8 | Vertical fissure | 0.41 | No abnormality | 2.83 | At a position different from the defect |

|  | Thermal shock resistance test: 4 pieces for each kind of specimens | | |
|---|---|---|---|
|  | Temp. difference Until not passed (° C.) | Hammering test | External appearance (crack formation position) |
| Example 4 | 850 | Metallic sound | Crack formation (about 135 degrees position With respect to the open tears) |
| Example 5 | 850 | Metallic sound | Crack formation (about 135 degrees position With respect to the open tears) |
| Comparative example 3 | 850 | Metallic sound | Crack formation (about 135 degrees position With respect to the open tears) |
| Comparative example 4 | 850 | Metallic sound | Crack formation (at the same position as the open tears) |
| Comparative example 5 | 700 | Metallic sound | Crack formation (about 135 degrees position With respect to the open tears) |
| Example 6 | 825 | Metallic sound | Crack formation: in about 45 degrees direction with respect to the passage in either case 1 piece: at the same position as the vertical fissure 3 pieces: at a position different from the vertical fissure |
| Example 7 | 825 | Metallic sound | Crack formation: in about 45 degrees direction with respect to the passage 4 pieces: at a position different from the vertical fissure |
| Comparative example 6 | 825 | Metallic sound | Crack formation: in about 45 degrees direction with respect to the passage in either case 1 piece: at the same position as the vertical fissure 3 pieces: at a position different from the vertical fissure |
| Comparative example 7 | 825 | Metallic sound | Crack formation: in about 45 degrees direction with Respect to the passage in either case |
| Comparative example 8 | 713 | Metallic sound | Crack formation: in about 45 degrees direction with respect to the passage 4 pieces: at a position different from the vertical fissure |

As to the pressure loss, with the honeycomb structures wound around with a ceramic mat on the outer circumference, placed in a cylindrical case and connected with a cone, the room temperature air was supplied for measuring the pressure difference in front of and in the rear of the honeycomb. As a result, all the specimens of the examples 4, 5 and the comparative examples 3 to 5 had the same values. Therefore, it was confirmed that there is no influence of the closure of 10 to 12 pieces of the passages with the repair material by the execution of the repair.

Next, for confirming the performance as a carrier for catalyst, the mechanical strength test and the thermal shock resistance test were executed as follows.

(1) Mechanical Strength Test

The mechanical strength test is referred to also as the isostatic test. An aluminum plate of about Φ106 mm and about a 20 mm thickness was placed on the upper and lower end faces of the honeycomb structure via a urethane sheet of about a 0.5 mm thickness. Furthermore, the side surface was wrapped with a urethane tube of about a 0.5 mm thickness so as to be sealed closely. Then, it was placed in a pressure container filled with water. The hydraulic pressure was raised gradually until 1 MPa. Then, it was taken out from the container for the external appearance observation (load resistance test). Thereafter, the honeycomb structure was sealed closely again and placed in the pressure container. The hydraulic pressure was raised and the pressure at the time when the burst sound was generated was recorded (destruction test). The test results are shown in the table 3 as the average value of 5 pieces of the specimens.

(2) Thermal Shock Resistance Test

The thermal shock resistance test was executed according to the method specified in the automobile standard JASO-M-505-87 with the honeycomb structure at a room temperature placed in an electric furnace maintained at 700° C.+room temperature. Those without the crack formation or other abnormalities, having a metallic sound in the hammering test were evaluated "passed", and those having the crack formation or having a dull sound in the hammering test were evaluated "not passed". The test was repeated with the electric furnace temperature raised by 50° C. each time until it becomes "not passed". The test results are shown in the table 3 as the average value of 4 pieces of the specimens.

Figure 2:
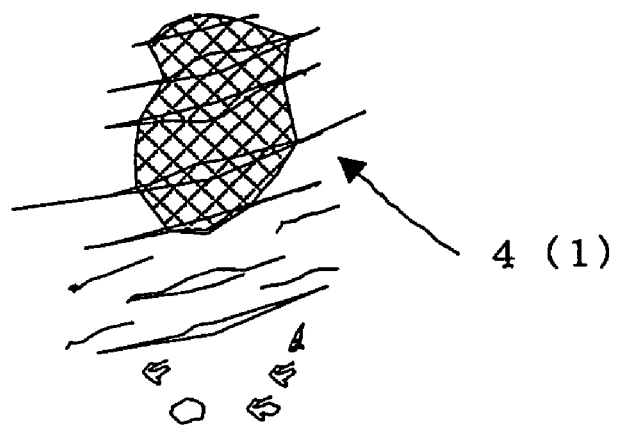
FIG. 2 is a partial perspective view showing schematically the lacking part by peel off of the outer wall in the part adjacent to the 3 to 4 mm width opening of the open tears in the comparative example 3.

As to the mechanical strength test, the examples 4, 5 and the comparative example 4 had the exactly same state as before the test. In contrast, those not repaired (comparative example 3) had the portions of the outer wall peeled adjacent to the opening of the open tears having the width of 3 to 4 mm, and as a consequence, the deficient portion 4 of about 5×4 to 10×8 mm which was formed from 3 to 4 pieces of the open tears as a unified defective portion (the hatching part in FIG. 2). Moreover, those not repaired (comparative example 3) showed a low destruction value at the open tear portion. In contrast, those repaired (examples 4, 5, comparative examples 4, 5) were not destructed at the repaired portions but at other portions. As a consequence, the improvement in the mechanical strength by the repair was confirmed.

As to the thermal shock resistance test, the highest temperature difference in the case of the specimens judged as "passed" was 85° C. for all of the 4 kinds of the specimens (examples 4, 5, comparative examples 3, 4). Furthermore, since there was crack formation at a part other than the open tears, it was confirmed that the open tears or the open tears repair does not influence the thermal shock resistance. On the other hand, the drastic decline was confirmed in the comparative example 5 due to the influence of the repair material applied on the outer circumference. It is assumed to have been caused by the application of the zirconium silicate having the coefficient of thermal expansion as large as $10 \times 10^{-6}/°C$. on the entire outer circumference.

Examples 6 and 7, Comparative Examples 6 to 8

40 pieces of the ceramic honeycomb structures before firing, having 5 lines of the vertical fissure 3 (see FIG. 1) within 180 degrees were prepared. The vertical fissure extended by about a 0.4 mm width in the outer walls along the entire length. For the depth (radial direction), some had the vertical fissure extending in the outer wall and the next two walls. As in the example 4, 10 pieces were repaired by coating a material kneaded with oil. Thereafter, they were fired with those without the repair so as to obtain the cordierite honeycomb structures having a 0.09 mm rib thickness, 62 passages/cm$^2$, and diameter Φ106 mm×height 114 mm.

Those repaired were referred to as the example 6, those without the repair were referred to as the comparative example 6, and those without the defect were referred to as the comparative example 7.

Moreover, 10 pieces fired without repair were repaired by coating a repair material produced by mixing 20% of a colloidal silica and 80% of cordierite fine particles by the weight ratio and kneading like a paste so as to make the coated surface thereon at the same plane as the outer walls so as to obtain the example 7. Moreover, by coating a zirconium silicate to the outer walls of 10 pieces of those fired without repair by the same manner as in the comparative example 5 so as to obtain the comparative example 8.

Next, the various performance tests shown below were executed for the examples 6, 7 and the comparative examples 6 to 8. The results are shown in the table 3. As to the examples 6, 7, as a result of the passage observation from the end face, only one passage adjacent to the outer walls was closed by the repair material at 5 portions. As to the honeycomb structures, the fall off and air leakage tests were executed in the same manner as in the example 1, and no abnormality was found. Moreover, as to the pressure loss, as in the example 1, there was no difference among the specimens from examples 6, 7, and comparative examples 6 to 8.

In the load resistance test in the mechanical strength test, the repaired goods (examples 6, 7, comparative examples 7, 8) were superior. Moreover, as to the destruction test, there was no difference among the specimens of examples 6, 7, and comparative examples 6 to 8. Although bending of the outer walls (comparative example 6) in the load resistance test in general is not regarded as "not passed", if it is formed at the time of canning, the outer walls of the bent portion can be scattered by the vibration at the time of use, or the like so that the exhaust gas comes in direct contact with the ceramic mat by 1 cell width for the mechanical support of the honeycomb structure, and thus it is not preferable.

As to the thermal shock resistance test, although one out of the 8 pieces of the repaired goods (examples 6 and 7) had crack at the repaired portion (the other 7 pieces had crack formation at the portions without repair), one out of the 4 pieces of the non repaired goods (comparative example 6) had crack formation at the vertical fissure part. From the results, although crack may be formed at the vertical fissure portion, considering there is no difference in destruction temperature, it can be concluded that there is no adverse effect inclusive of the decline in the destruction temperature, or the like by the repair.

INDUSTRIAL APPLICABILITY

The ceramic honeycomb structure of the present invention can be used preferably as a filter for scavenging fine particles in the exhaust gas such as an internal combustion engine, a boiler, or the like.

The invention claimed is:

1. A ceramic honeycomb structure comprising:
a number of passages divided by a number of partition walls;
an outer wall dividing the passages from an outside of the honeycomb structure; and
a ceramic material filled into at least one defective area on a surface of the outer wall, the defective area having a hole of at least 0.1 mm in width communicating with the passage and the outside, wherein the ceramic material is further filled into the passage communicating with the hole and wherein the ceramic material has a porosity and a water absorbing ratio that is the same as or less than a porosity and a water absorbing ratio, respectively, of a material of the ceramic honeycomb structure.

2. The honeycomb structure according to claim 1, wherein a thickness of the partition walls is 0.115 mm or less.

3. The ceramic honeycomb structure according to claim 1, wherein the ceramic material is composed mainly of a material same as that of the ceramic honeycomb structure.

4. The ceramic honeycomb structure according to claim 3, wherein the ceramic honeycomb structure is a formed body comprising water soluble binder, and the ceramic material is composed of a raw material kneaded with oil.

5. The ceramic honeycomb structure according to claim 3, wherein the ceramic honeycomb structure is a fired body, and the ceramic material is composed mainly of cordierite particles and colloidal silica.

6. The ceramic honeycomb structure according to claim 1, wherein the ceramic honeycomb structure is a fired body, and the ceramic material is a catalyst slurry composed mainly of γ-alumina.

7. The ceramic honeycomb structure according to claim 2, wherein the ceramic honeycomb structure is a fired body, and the ceramic material is a catalyst slurry composed mainly of γ-alumina.

8. The ceramic honeycomb structure according to claim 1, wherein the honeycomb structure has a coefficient of thermal expansion of less than $3.0 \times 10^{-6}/°$ C. in a part where the ceramic material is filled into.

* * * * *